S. H. DEAVER.
TRAMMEL.
APPLICATION FILED JUNE 18, 1913.
1,198,114.
Patented Sept. 12, 1916.
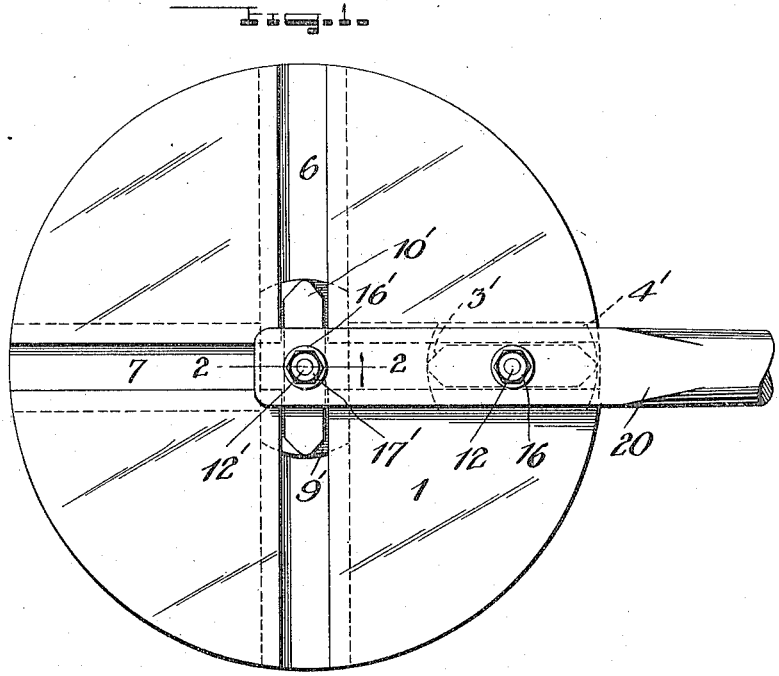
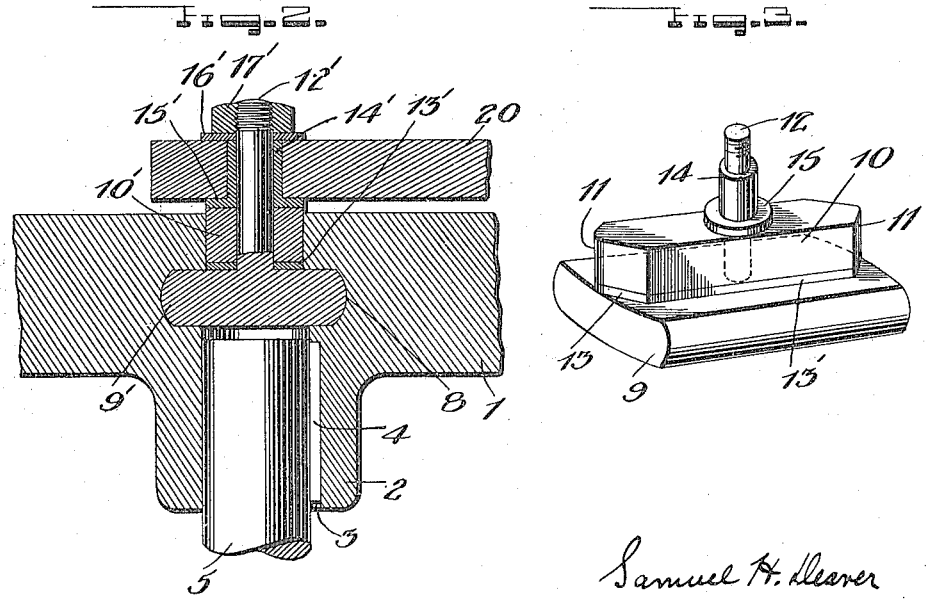
WITNESSES
W. H. Rockwell
May Barnes.
Samuel H. Deaver
INVENTOR
George W. Sues.
Attorney

UNITED STATES PATENT OFFICE.

SAMUEL H. DEAVER, OF DEMING, NEW MEXICO.

TRAMMEL.

1,198,114.  Specification of Letters Patent.  Patented Sept. 12, 1916.

Application filed June 18, 1913. Serial No. 774,418.

*To all whom it may concern:*

Be it known that I, SAMUEL H. DEAVER, a citizen of the United States, and resident of Deming, in the county of Luna and State of New Mexico, have invented certain new and useful Improvements in Trammels, of which the following is a specification, reference being had to the accompanying drawings.

This invention has relation to certain new and useful improvements in trammels and comprises a driven wheel arranged to impart four strokes to a connected pitman for each revolution of the wheel.

The object of my invention is to provide a pitman operating mechanism arranged to be used in connection with agricultural implements, pumps and other machinery to double the speed of the pitman without increasing the speed of the pitman driven wheel.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views:

Figure 1, shows a face view of the trammel and a broken portion of the connection pitman. Fig. 2, shows a fragmentary sectional view on line 2, 2, of Fig. 1. Fig. 3, shows a perspective view of one of the slide blocks and connected guide blocks.

In the accompanying drawings the numeral 1, designates a trammel wheel which is provided with the slots 6 and 7, which cross one another at right angles. This cruciform slot cuts the face of the wheel as shown, and each slot communicates with a slot 8, of greater width than the slots. The trammel wheel is provided with the hub 2, having a shaft opening to receive the shaft 5, and a groove 3, to receive the spline 4, so that the trammel wheel may be securely fixed to the driving shaft 5.

Sliding within the slots 8, are two similar slide blocks 9 and 9'. In Fig. 3, a detail of the slide block 9, is shown and this slide block is provided with a projecting threaded stud 12. A bearing plate 13, is removably held upon the stud 12, and resting upon this bearing plate 13, is the guide block 10, which has its ends pointed, as shown at 11. The slide block 9, is of such a width as to snugly fit within the slot, while the guide block is preferably of a width a little less than the width of the slot. The stud 12, gives support to a collar 14, having an extending bearing flange 15, the collar being arranged to receive a washer 16, securely held to the collar by means of a nut 17. As shown in Fig. 1, two such slide and guide blocks are employed. Within one slot, is placed the guide block 9', having the stud 12', giving support to the bearing plate 13', and the guide block 10'. Held upon this stud 12', is the collar 14', having the bearing flange 15', the washer 16', being held in position by means of the bolt 17'. In connection with these two slide and guide blocks I employ a pitman 20, having two bearing openings, arranged to revolubly receive the collars 14 and 14'. In securing the pitman 20, the slide blocks with their connected guide blocks are placed within the slots at right angles to one another, as shown in Fig. 1. A pitman is then placed upon the collars when the nuts 17 and 17' are screwed down to firmly bind the collars to the guide blocks. Through this arrangement the guide blocks, as they wear, can be adjusted. So also as the slide blocks wear out the slots or themselves wear out, the guide blocks can be given adjustment or raised in interposing the bearing plates between the guide and slide blocks.

From the foregoing it will be seen that I provide a trammel wheel with a pitman connected thereto, by means of a mechanism including a guide block, slide block and a collar, the instrumentalities being adjustably and removably connected. These trammel wheels and pitmen may be made in different sizes and are durable of construction and positive of operation, insuring the pitman making four strokes to every revolution of the wheel.

Having thus described my said invention, what I claim as new and desire to secure by United States Letters Patent is:

A trammel wheel having its face traversed by two slots crossing one another at a right angle each slot communicating with a slot of a greater width, a slide block held within each slot having a projecting threaded stud, said slide blocks held at a right angle to one another, a guide block
5 traveling within said slots and removably held upon each stud, a collar held upon each stud having a bearing flange, nuts upon said studs to hold said collars to said guide blocks, and a bearing plate interposed
10 between each slide block and guide block, whereby said collars may be adjusted relative to the face of said trammel wheel.

In testimony whereof I affix my signature, in the presence of two witnesses.

SAMUEL H. $\overset{\text{his}}{\times}$ DEAVER.
mark

Witnesses:
ALICE GRIMES,
M. A. PLAHN.